(12) United States Patent
Fang

(10) Patent No.: US 10,378,710 B2
(45) Date of Patent: Aug. 13, 2019

(54) HOLOGRAPHIC ELECTRONIC CANDLE

(71) Applicant: Jian Fang, Shenzhen (CN)

(72) Inventor: Jian Fang, Shenzhen (CN)

(*) Notice: Subject to any disclaimer, the term of this patent is extended or adjusted under 35 U.S.C. 154(b) by 20 days.

(21) Appl. No.: 15/682,700

(22) Filed: Aug. 22, 2017

(65) Prior Publication Data

US 2018/0058650 A1    Mar. 1, 2018

(30) Foreign Application Priority Data

Aug. 30, 2016 (CN) .......................... 2016 1 0778067

(51) Int. Cl.
| | | |
|---|---|---|
| *F21S 10/02* | (2006.01) | |
| *F21S 10/04* | (2006.01) | |
| *F21L 4/00* | (2006.01) | |
| *F21S 6/00* | (2006.01) | |
| *G03H 1/04* | (2006.01) | |
| *F21W 121/00* | (2006.01) | |
| *F21S 9/02* | (2006.01) | |

(52) U.S. Cl.
CPC ................. *F21S 10/04* (2013.01); *F21L 4/00* (2013.01); *F21S 6/001* (2013.01); *G03H 1/04* (2013.01); *F21S 9/02* (2013.01); *F21W 2121/00* (2013.01)

(58) Field of Classification Search
CPC .. F21S 10/04; F21S 6/001; F21L 4/00; G03H 1/04; F21W 2121/00
USPC ..................................... 362/161, 311.01, 392
See application file for complete search history.

(56) References Cited

U.S. PATENT DOCUMENTS

| | | | | |
|---|---|---|---|---|
| 4,947,299 A | * | 8/1990 | Lin ......................... | F21L 27/00 359/1 |
| 9,949,346 B2 | * | 4/2018 | Patton ................ | H05B 37/0272 |
| 2009/0323031 A1 | * | 12/2009 | Adler ...................... | F21S 13/12 353/62 |
| 2014/0254148 A1 | * | 9/2014 | Fournier ................... | F21L 4/00 362/235 |
| 2015/0338086 A1 | * | 11/2015 | Patton ................. | F21V 33/0052 362/96 |
| 2018/0033358 A1 | * | 2/2018 | Patton .................. | G09G 3/3225 |

FOREIGN PATENT DOCUMENTS

CA           2473284 C  *  9/2005  ............... G03H 1/22

* cited by examiner

*Primary Examiner* — Paultep Savusdiphol
(74) *Attorney, Agent, or Firm* — W&K IP

(57) ABSTRACT

The present invention relates to a field of daily articles, especially to a holographic electronic candle including a candle body; at least one image play device arranged inside of the candle body. The holographic electronic candle can even project vivid three-dimensional flames, other three-dimensional pictures, such as humans or cartoons or continuous three-dimensional animation, apart from the advantages of the exiting electronic candles. The users can watch the vivid three-dimensional flames or other pictures or animations, or other different surfaces in the three-dimension, from different perspectives with the resulting fun, which may improve the user's interest. The holographic electronic candles have broad application as the crafts, producing good profits as well.

8 Claims, 2 Drawing Sheets

HOLOGRAPHIC ELECTRONIC CANDLE

CROSS-REFERENCE TO RELATED APPLICATIONS

This application claims priority to Chinese Patent Application No. 201610778067.7 with a filing date of Aug. 30, 2016. The content of the aforementioned applications, including any intervening amendments thereto, are incorporated herein by reference.

TECHNICAL FIELD

The present disclosure relates to a field of daily articles, and in particular to a holographic electronic candle.

BACKGROUND OF THE PRESENT INVENTION

Candles have been used as a daily lighting tool for thousands of years, made by wax, capable of combustion to emit light or heat. Moreover, the candle plays an important role for ceremonial purposes such as in a birthday party, a religious festival, a collective grief, a wedding and a funeral etc. The combustion of the traditional wax candles not only damages environment, but also is a potential fire hazard and obviously cannot be reused.

In order to solve the above problem, some electronic candles are appeared in the market. However, they are using LED lamps, light intensity may be adjusted by controlling the current in the whole circuit to produce the effect of flashing. In either of the above ways, the flashing effect is bad, unreal without good simulative effect, as well as users' product experience is poor, they are obviously necessary to be improved.

In addition, the existing candles can only emit light, but fail to project other pictures or animations without resulting fun, which cannot attract users to use the candles. And the existing candles can only be used as fast moving consumer goods, cannot be used as crafts, having to be improved accordingly.

SUMMARY OF PRESENT INVENTION

The present disclosure provides a holographic electronic candle to solve the above-mentioned problems, the holographic electronic candle can even project vivid three-dimensional flames or other three-dimensional pictures, such as humans or cartoons or continuous three-dimensional animation, apart from the advantages of the exiting electronic candles. The users can watch the vivid three-dimensional flames, pictures or animations, or watch other different surfaces in the three-dimension flames, pictures or animations, from different perspectives which results a lot of fun, which may attract the user's interest for usage. The holographic electronic candles have broad application in our daily lives, as well as can be the crafts, producing good profits accordingly.

The aim of the present disclosure can be realized by the technical schemes hereinafter:

A holographic electronic candle includes a candle body, inside of the candle body has at least one image play device.

In which, outside of the candle body has at least one diffraction body. The number of diffraction bodies equals to the number of image play devices, and one diffraction body is corresponding to one image play device, the image play device is connected to the diffraction body.

Furthermore, the diffraction bodies are arranged to disperse on a top surface, a bottom surface and/or a side surface of the candle body.

Furthermore, the diffraction body is a tetrahedral, a quadrangular frustum pyramid or a cylinder, which is hollow or solid.

Furthermore, the candle body includes a shell, a power supply and a circuit board arranged inside of the shell, the image play devices are arranged inside of the shell, the power supply and the image play devices are electrically connected with the circuit board respectively.

Furthermore, a micro-data storage electrically connected to the circuit board is configured for storing object wave information.

Furthermore, the shell is made by wax, plastics, glasses or ceramics and so on.

Furthermore, the image play device includes a fixing base and a display screen, the fixing base is fixed in the shell and the display screen is fixedly connected to the fixing base.

Furthermore, the shell has a power interface, the power interface is electrically connected to the circuit board.

Furthermore, the number of the power interface is two, one is supplying power to supplying power to the electric candles while the other one is supplying power to accessory components of the holographic electronic candle.

The beneficial effect of the present disclosure is that the holographic electronic candle can even project vivid three-dimensional flames, other three-dimensional pictures, or continuous three-dimensional animation such as humans or cartoons, apart from the advantages of the exiting electronic candles. The users can watch the vivid three-dimensional flames, other pictures or animations, or other different surfaces in the three-dimension, from different perspectives and hence producing a lot of fun, which may attract the user's interest for usage. The holographic electronic candles have broad application in our daily lives, as well as can be the crafts, producing good profits accordingly.

DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

DESCRIPTION OF REFERENCE SIGNS

1—the candle body; 2—the diffraction body; 3—the display screen; 4—the fixing base; 5—the power supply; 6—the shell.

Objective achieving, function features, and advantages of the present invention are further described with reference to the embodiments and the accompany drawings.

DETAILED DESCRIPTION OF PREFERRED EMBODIMENTS

Technical solutions of the present invention are further described in detail with reference to the accompanying drawings and embodiments. It is to be understood that the specific embodiments described herein are merely used for describing the present invention, but are not intended to limit the present invention.

It is to be understood that, all the directional instructions in the present disclosure (such as top, down, left, right, front, back, upper, lower. . . ) can only be used for explaining relative position relations, moving condition of the elements under a special form (referring to figures), and so on, if the special form changes, the directional instructions changes accordingly.

Embodiment 1

Figure 1:
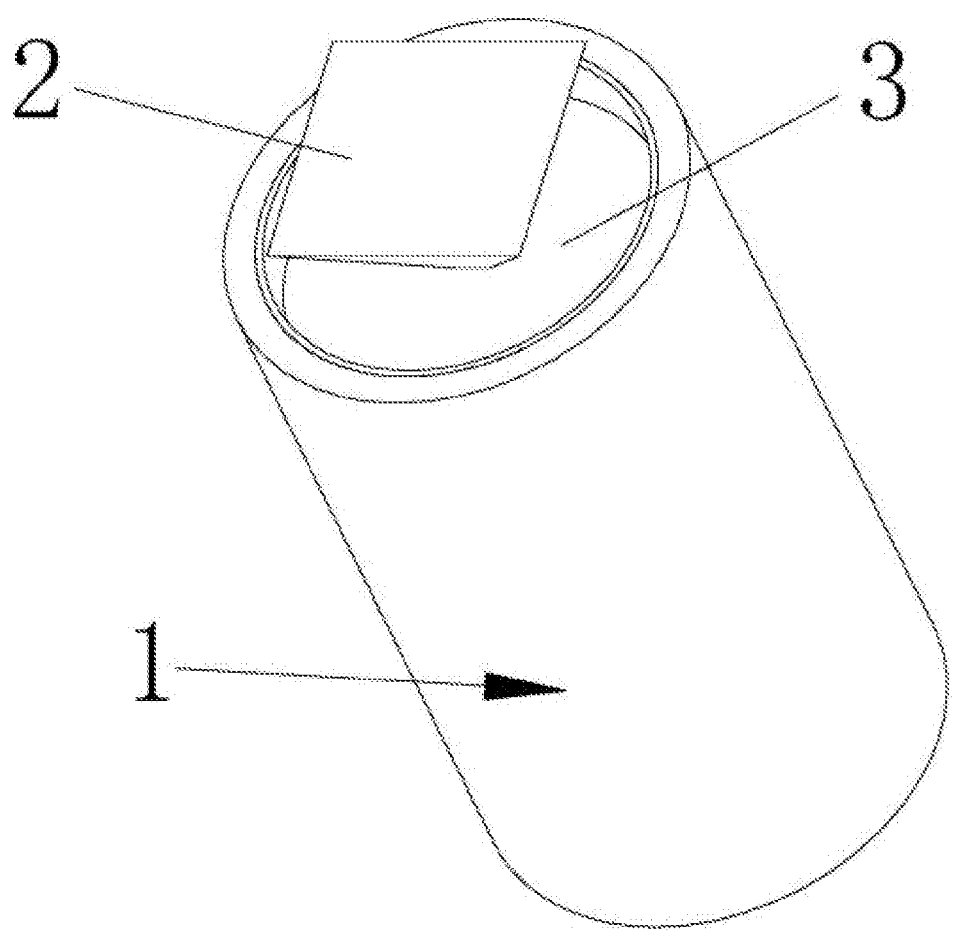
FIG. 1 is a structural diagram of the holographic electronic candle of the present invention.
Figure 2:
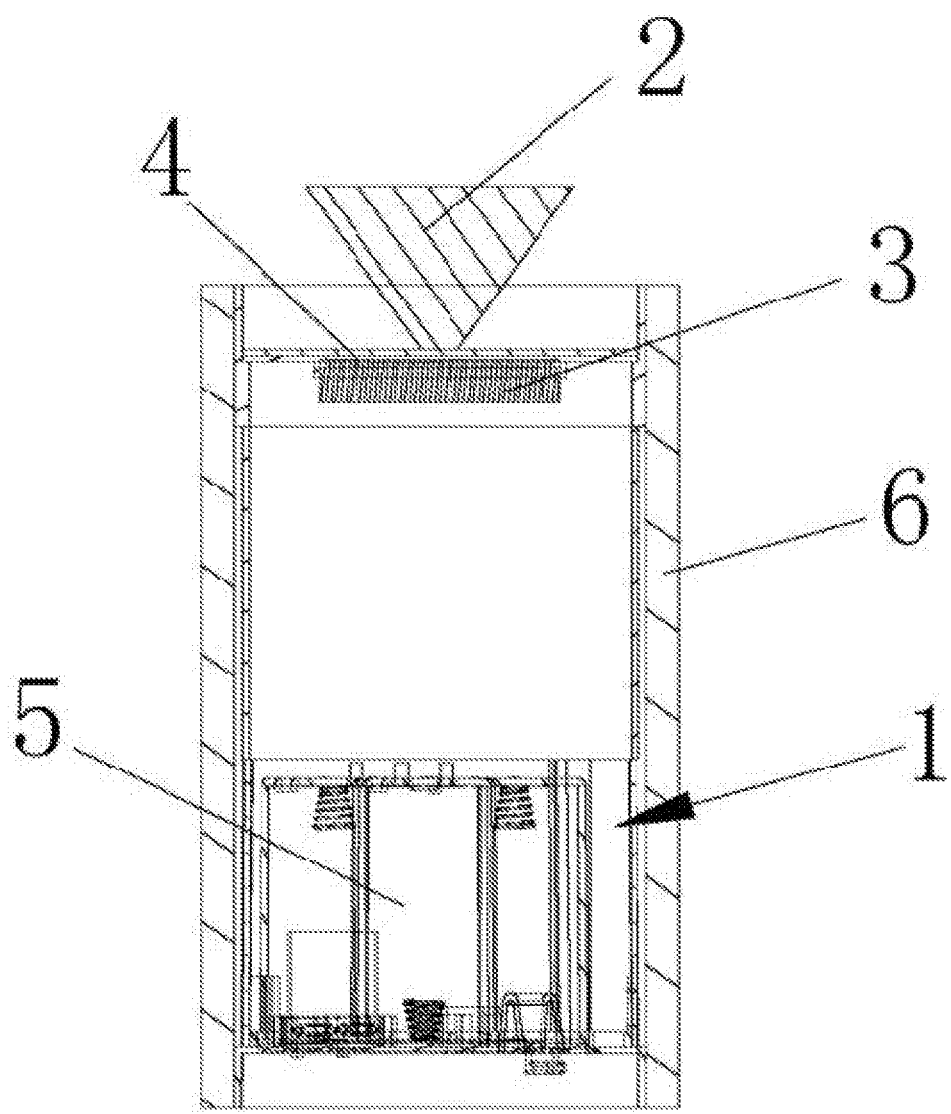
FIG. 2 is a sectional view of the holographic electronic candle of the present invention.

As shown in FIG. 1 and FIG. 2, a holographic electronic candle includes: a candle body 1, inside of the candle body 1 has at least one image play device arranged at the upper part of the candle body 1. Outside of the candle body 1 has at least one diffraction bodies 2 arranged on top surface of the candle body 1. The number of diffraction bodies 2 equals to the number of image play devices, and one diffraction body 2 is corresponding to one image play device, the image play device is connected to the diffraction body 2. The image play device includes a fixing base 4 and a display screen 3, the fixing base 4 is fixed in the upper part of the shell 6 and the display screen 3 is fixedly connected to the fixing base 4. The candle body 1 includes the shell 6, a power supply 5 and a circuit board arranged inside of the shell 6, at lower part of the shell 6, as shown in FIG. 2. The image play devices are arranged inside of the shell 6 and at upper part of the shell 6. The power supply 5 and the image play devices are electrically connected with the circuit board. A micro-data storage is electrically connected to the circuit board, configured for storing object wave information.

The principle of the present disclosure is downloading the existing 3D holographic image material from the Internet, and storing the material into the micro-data storage, the circuit board extracts needed 3D holographic image material from the micro-data storage, then displaying the 3D holographic image material via an image play device. When displaying, the 3D image would appear on the diffraction body 2, people can see the 3D image with a strong three-dimensional effect, and people can watch the 3D image with strong real effect from different perspectives.

Therefore, the holographic electronic candle can even project vivid three-dimensional flames, other three-dimensional pictures, such as humans or cartoons or continuous three-dimensional animation, apart from the advantages of the exiting electronic candles. The users can watch the vivid three-dimensional flames or other pictures or animations, or watch other different surfaces in the three-dimension flames, other pictures or animations from different perspectives, and hence producing a lot of fun, which may attract the user's interest for usage. The holographic electronic candles have broad application in our daily lives as well as can be the crafts, producing good profits accordingly.

In the embodiments of the present disclosure, the diffraction bodies 2 may be arranged on a top surface, a bottom surface and/or a side surface of the candle body. Therefore, the 3D image may be projected on the top surface, the bottom surface and/or the side surface of the candle body, to further allow the users to watch from different perspective.

In the embodiments of the present disclosure, the diffraction body 2 may be a tetrahedral, a quadrangular frustum pyramid or a cylinder, which is hollow or solid. And the structure thereof is easy to form but has good diffraction effect, enabling the 3D material displayed in the display screen 3 to present vividly via the diffraction body 2 producing strong three-dimension effect.

In the embodiments of the present disclosure, the shell 6 is made by wax that improves the simulation of the electronic candle enabling the shell 6 to be more similar to the real candle, and can be replaced easily, the users' experiments are good.

In the embodiments of the present disclosure, the shell 6 has a power interface, the power interface is electrically connected to the circuit board. The power interface may supply power to not only the electronic candles, but also the accessory components of the electronic candles.

In the embodiments of the present disclosure, the number of the power interfaces are two, one of the power interfaces may supply power to the electronic candles, the other one may supply power to the accessory components of the electronic candles.

The foregoing descriptions are merely embodiments of the present invention, and are not intended to limit the scope of the present invention. An equivalent structural or equivalent process alternation made by using the content of the specification and drawings of the present invention, or an application of the content of the specification and drawings directly or indirectly to another related technical field, shall fall within the protection scope of the present invention.

I claim:

1. A holographic electronic candle comprising:
a candle body;
at least one image play device arranged inside of the candle body; wherein the image play device comprises a fixing base and a display screen, the fixing base is fixed in the candle body and the display screen is fixedly connected to the fixing base; outside of the candle body has at least one diffraction body; the number of the diffraction bodies equals to the number of image play devices, one diffraction body is corresponding to one image play device, and the image play device is connected to the diffraction body.

2. The holographic electronic candle of claim 1, wherein the diffraction bodies are arranged on a top surface, a bottom surface and/or a side surface of the candle body.

3. The holographic electronic candle of claim 1, wherein the diffraction body is a tetrahedral, a quadrangular frustum pyramid or a cylinder, which is hollow or solid.

4. The holographic electronic candle of claim 1, wherein the candle body comprises a shell, a power supply and a circuit board that are arranged inside of the shell, the image play device is arranged inside of the shell, the power supply and the image play devices are electrically connected with the circuit board.

5. The holographic electronic candle of claim 4, wherein a micro-data storage electrically connected to the circuit board is configured for storing object wave information.

6. The holographic electronic candle of claim 4, wherein the shell is made by wax, plastics, glasses or ceramics.

7. The holographic electronic candle of claim 6, wherein the shell has a power interface electrically connected to the circuit board.

8. The holographic electronic candle of claim 7, wherein the number of the power interfaces are two, one being configured for supplying power to the electric candles, the other one being configured for supplying power to accessory components of the holographic electronic candle.

\* \* \* \* \*